US006980837B2

(12) United States Patent
Chung

(10) Patent No.: US 6,980,837 B2
(45) Date of Patent: Dec. 27, 2005

(54) AUTOMATIC MODE CHANGING METHOD FOR CAR AUDIO SYSTEM WITH HANDS-FREE THEREIN

(75) Inventor: Chang-Ho Chung, Seoul (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 241 days.

(21) Appl. No.: 10/720,338

(22) Filed: Nov. 25, 2003

(65) Prior Publication Data

US 2005/0054386 A1    Mar. 10, 2005

(30) Foreign Application Priority Data

Sep. 6, 2003   (KR) ...................... 10-2003-0062332

(51) Int. Cl.[7] .............................................. H04M 1/00
(52) U.S. Cl. ............................... 455/569.2; 455/569.1; 455/575.9; 340/540; 340/539.1; 379/387.01
(58) Field of Search .......................... 455/569.2, 569.1, 455/575.9; 340/540, 539.1; 379/387.01

(56) References Cited

U.S. PATENT DOCUMENTS

| | | | |
|---|---|---|---|
| 5,036,532 A * | 7/1991 | Metroka et al. | ............. 455/566 |
| 5,596,638 A * | 1/1997 | Paterson et al. | ......... 455/575.2 |
| 6,052,603 A * | 4/2000 | Kinzalow et al. | ............ 455/557 |
| 6,593,848 B1 * | 7/2003 | Atkins, III | ............... 340/425.5 |
| 2002/0086716 A1 * | 7/2002 | Pan | ............................ 455/569 |
| 2005/0090279 A9 * | 4/2005 | Witkowski et al. | ....... 455/550.1 |
| 2005/0156753 A1 * | 7/2005 | DeLine et al. | ........... 340/693.5 |

FOREIGN PATENT DOCUMENTS

| | | |
|---|---|---|
| KR | 2000-1206 | 1/2000 |
| KR | 2000-26077 | 5/2000 |
| KR | 2000-36639 | 7/2000 |
| KR | 2000-41692 | 7/2000 |
| KR | 2002-4153 | 1/2002 |

OTHER PUBLICATIONS

English Language Abstract of KR 2002-4153.

* cited by examiner

Primary Examiner—Danh Cong Le
(74) Attorney, Agent, or Firm—Greenblum & Bernstein, P.L.C.

(57) ABSTRACT

The present invention relates to an automatic mode converting method between an audio mode and a hands-free mode for a hands-free built-in car audio system of which a car audio function is organically combined with a hands-free function, in which the mode changing is carried out, depending on whether there is a voice signal output from a mobile phone. The automatic mode converting method, wherein the car audio system has a mode converting function conducting mode conversion between a hands-free mode for outputting a received voice signal from a mobile phone and an audio mode for outputting an audio sound source of the car audio system, includes the steps of: deciding whether a DTMF tone signal is input from the mobile phone; if the DTMF tone signal is input from the mobile phone, converting a current mode to the hands-free mode; and if a duration time of a greater level of the received voice signal from the mobile phone than a predetermined reference level lasts longer than a predetermined reference time, automatically converting the current mode to the audio mode.

2 Claims, 3 Drawing Sheets

[FIG. 1] PRIOR ART
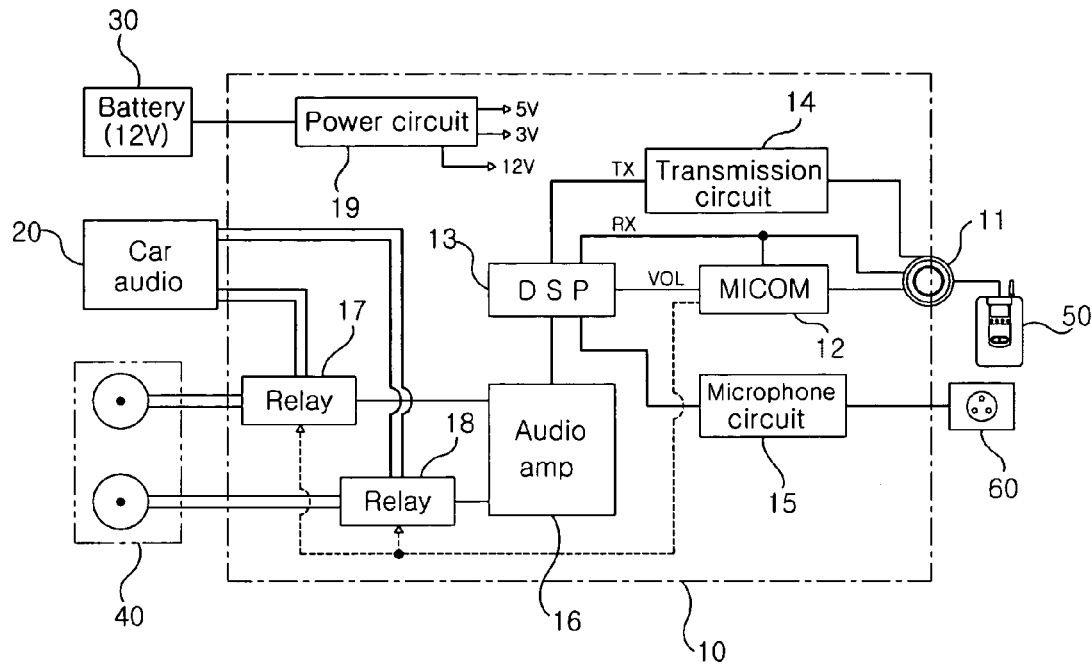
[FIG. 2]
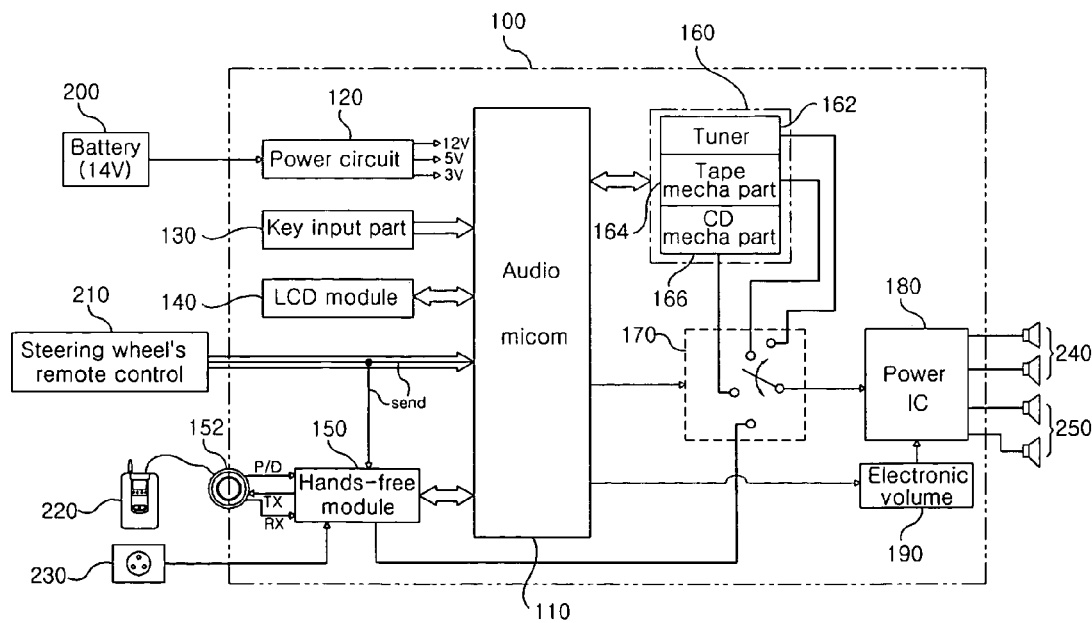

[FIG. 3]
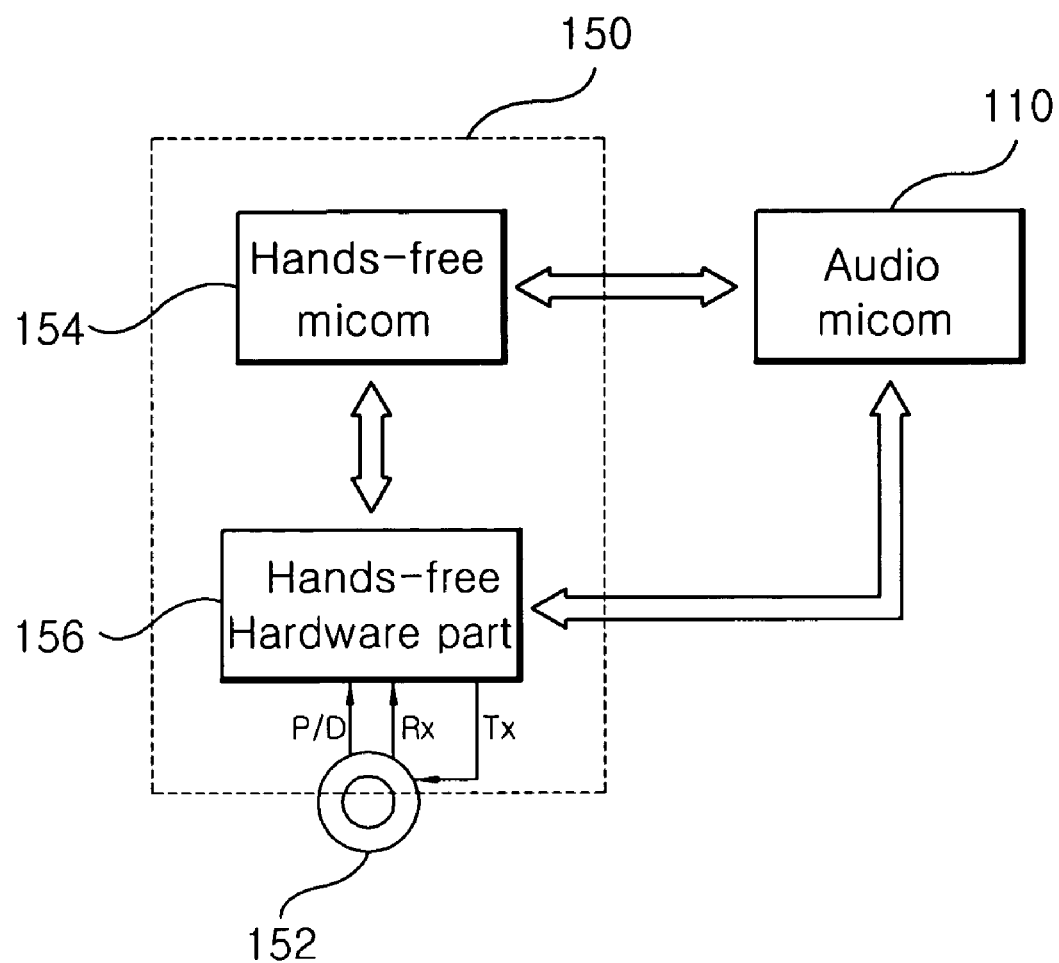

[FIG. 4]
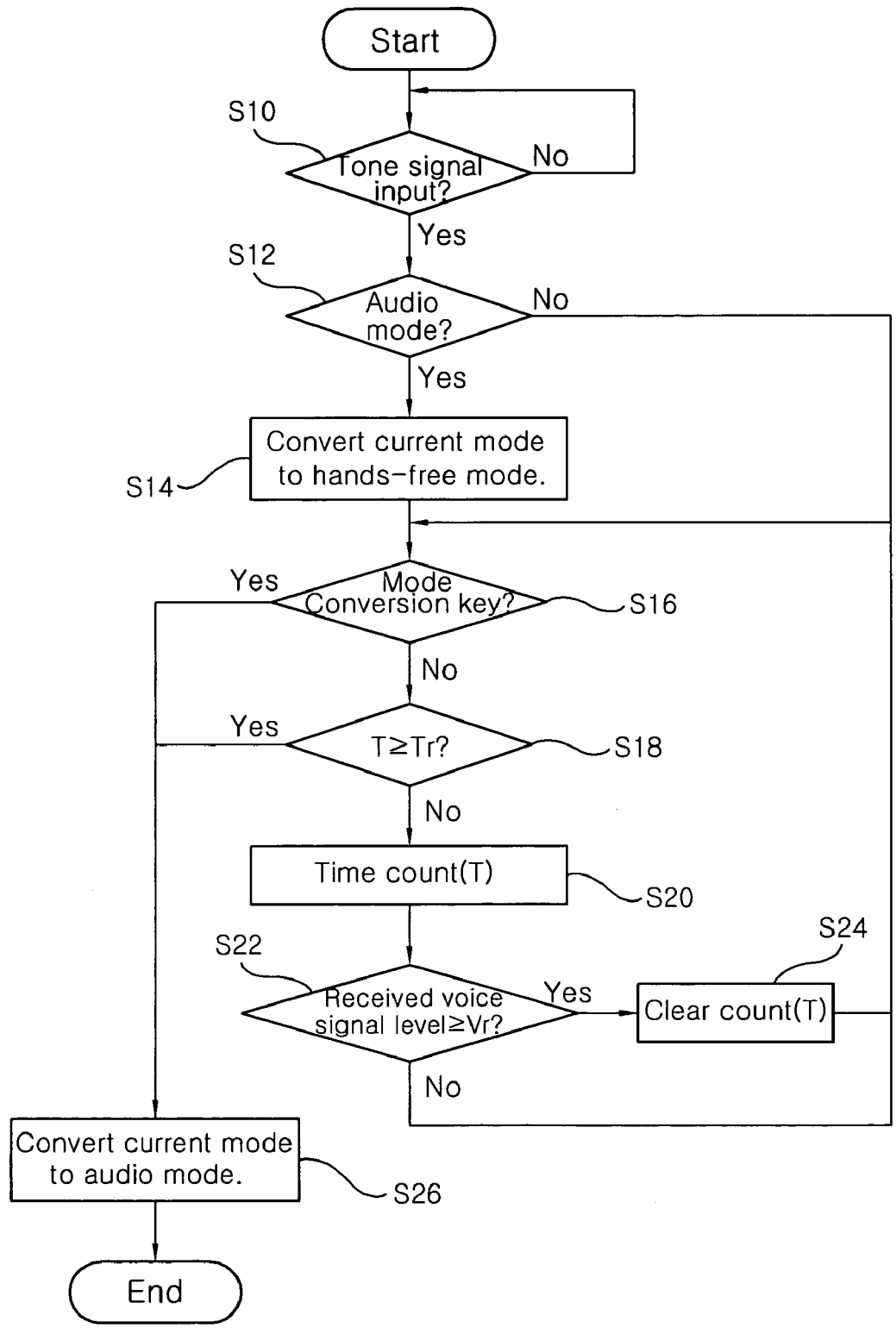

AUTOMATIC MODE CHANGING METHOD FOR CAR AUDIO SYSTEM WITH HANDS-FREE THEREIN

The present disclosure relates to subject matter contained in priority Korean Application No. 10-2003-0062332, filed on Sep. 6, 2003, which is herein expressly incorporated by reference in its entirety.

BACKGROUND OF THE INVENTION

1. Field of the Invention

The present invention relates to a car audio system with a built-in hands-free, more specifically, an automatic mode converging method between an audio mode and a hands-free mode for a car audio system of which car audio kit is organically interconnected with a hands-free.

2. Description of the Related Art

It is a well-known fact that as diverse electronic communication techniques are developed, a mobile phone is something almost every one now possessed. Particularly, a car with a hands-free function is now being developed for car drivers who wish to communicate with business or personal acquaintances conveniently and safely while driving a car. In the past, this hands-free function was an option, unlike a car audio function that is one of basic parts of the car.

FIG. 1 is an electric block diagram of a related art hands-free for use with a car. As shown in FIG. 1, the hands-free for a car according to the related art is built in a separate kit 10 different from a car audio kit 20. This separate kit 10 includes a power circuit 19 for providing voltage provided from a car battery 30 to each part of the device after converting the voltage to a designated voltage, a mobile phone jack 11 for connecting an ear phone of the mobile phone 50 to the mobile phone through a wire, a microphone circuit 15 for processing an output voice signal being input through a microphone 60 that is attached to a suitable position of a car, e.g. around the ceiling above a driver, a transmission circuit 14 for transmitting the output voice signal to the mobile phone 50 through the mobile phone jack 11, a DSP (Digital Signal Processor) 13 for sending the output voice signal transmitted from the microphone circuit 15 to the transmission circuit 14 and for processing a received voice signal provided through the mobile phone jack 11, an audio amplifier (Amp) 16 for amplifying a processed voice signal by the DSP 13, relays 17 and 18 for selectively connecting speakers 40 on both sides (right and left) in front of the car to the audio amp 16 or an electric IC (not shown) of the car audio kit 20, and a micom (hereinafter, it is referred to as a 'hands-free micom') 12 for controlling operations of the relays based on a decision whether the driver made a call using the mobile phone 50.

With the above constitution, if a current user is not on the phone at the moment, the hands-free micom 12 controls the relays 17 and 18, to connect a power IC of the car audio kit 20 to a front speaker 40, allowing the user to listen to music or broadcast he or she wants through the front speaker 40 and a rear speaker (not shown). On the other hand, if the user makes a call in this state, the hands-free micom 12 controls the relays 17 and 18, to connect the front speaker 40 to the audio amp 16 inside the audio kit 10, whereby a voice signal from the other end of the call is output through the front speaker 40.

However, the traditional hands-free for a car as discussed before has problems in that it occupies a lot of space primarily because the device is built in a separate kit from the car audio kit, and shares only the front speaker of the car with the car audio system. Moreover, it requires a separate voice signal processing circuit like the audio amp, and a separate power circuit. In addition, since the traditional hands-free is operated independent of the car audio system, if there is a call while music or broadcast is played from the rear speaker, it is hard for the user to catch a telephone call being output from the front speaker. Besides, speech quality is often deteriorated because a low-grade audio amp amplifies voice signals.

Moves have been under way to relieve problems with the above related art techniques, including Korean Patent Publication Nos. 2002-4153 (Publication date: Jan. 16, 2002), 2000-41692 (Publication date: Jul. 15, 2000), 2000-36639 (Publication date: July 5), 2000-26077 (Publication date: May 6, 2000), and 2000-1206 (Publication date: Jan. 15 2000. According to the teachings of the above related arts, an audio mode (this is a state where audio sounds are output through a speaker) is not automatically changed to a hands-free mode (this is a state where a telephone conversation, not the audio sounds is output through the speaker) until the driver (or the user) operates number keys on the mobile phone to input a telephone number, followed by pressing a 'send' key on his mobile phone. A further problem is that after the driver completes the call, he has to operate all conversion keys to switch the hands-free mode back to the audio mode.

SUMMARY OF THE INVENTION

It is, therefore, an object of the present invention to provide an automatic mode converting method between an audio mode and a hands-free mode for a hands-free built-in car audio system of which a car audio function is organically combined with a hands-free function, in which the mode changing is carried out, depending on whether there is a voice signal output from a mobile phone.

To achieve the above object, there is provided an automatic mode converting method for a car audio system with a hands-free therein, wherein the car audio system has a mode converting function conducting mode conversion between a hands-free mode for outputting a received voice signal from a mobile phone and an audio mode for outputting an audio sound source of the car audio system, the method including the steps of: deciding whether a DTMF tone signal is input from the mobile phone; if the DTMF tone signal is input from the mobile phone, converting a current mode to the hands-free mode; and if a duration time of a greater level of the received voice signal from the mobile phone than a predetermined reference level lasts longer than a predetermined reference time, automatically converting the current mode to the audio mode.

In the exemplary embodiment, if a manual operation key signal of the mode conversion function is input, the current mode is automatically converted to the audio mode, regardless of whether or not the reference time is passed.

BRIEF DESCRIPTION OF THE DRAWINGS

The above objects, features and advantages of the present invention will become more apparent from the following detailed description when taken in conjunction with the accompanying drawings, in which:

FIG. 1 is an electric block diagram of a related art hands-free for use with a car;

FIG. 2 is an electric block diagram of a car audio system with a hands-free therein according to the present invention;

FIG. 3 is a detailed block diagram of a hands-free module in FIG. 2; and

FIG. 4 is a flow chart describing an automatic mode changing method for a car audio system with a hands-free therein according to the present invention.

DETAILED DESCRIPTION OF THE PREFERRED EMBODIMENT

A preferred embodiment of the present invention will be described herein below with reference to the accompanying drawings.

FIG. 2 is an electric block diagram of a car audio system with a hands-free therein according to the present invention, and FIG. 3 is a detailed block diagram of a hands-free module in FIG. 2. As illustrated in FIG. 2, an electrical configuration of the car audio system with a hands-free therein includes a power circuit 120 for providing a voltage provided from a car battery 200 to every part of the system after converting the voltage to an appropriate form being required, a car audio sound source 160 consisting of a tuner 162, a tape mecha part 164 and a CD mecha part 166, a key input part 130 mounted on an operation panel exposed in front of a car driver, an LCD module 140 for displaying operational states of the car audio and hands-free, a hands-free jack 152 connected to an earphone jack of a mobile phone 220 through a wire, a hands-free micom in a detachable hands-free illustrated in FIG. 1, a hands-free module 150 consisting of a transmission circuit, a microphone circuit and a DSP, a power IC 180 for amplifying voice signals to drive a front speaker 240 and a rear speaker 150 of the car, an electronic volume 190 for adjusting amplification degree of the power IC 180, a switching part 170 for selectively connecting voice signals received from each sound source of the car audio sound source 160 to the power IC 180 and the hands-free module 150 to the power IC 180, and an audio micom 110 for controlling each of the parts. Here, all the above parts are built in one single audio kit 100.

In relation with a hands-free function, the key input part 130 includes a send key, a mode conversion key for converting (or changing) a hands-free mode to an audio mode or vice versa, and optionally a secrete send key for outputting a received voice signal through an earphone instead of the speaker. The switching part 170 is typically an electronic switch.

The hands-free module 150, as depicted in FIG. 3, includes a hands-free micom 154, and a hands-free hardware part 156 consisting of the transmission circuit, the microphone circuit and the DSP in FIG. 1. The hands-free hardware part 156 includes a mobile phone jack 152 that is connected to the earphone jack of the mobile phone 220. Further, even though the hands-free micom 154 does not require a program for controlling the relays in the related art hands-free, the audio micom 110 requires not only the related art car audio system controlling program, but also a program for communicating with the hands-free module 150, and a program for controlling the switching part 170 has to be changed as well. Also, if a current mode is in conversation mode, the audio micom 110 can display characters on the LCD module 140 to inform the current mode. Certainly, the send key can be placed at the steering wheel's remote control 210 only. In the drawing, the reference numeral 230 indicates a microphone installed at the ceiling above the car driver.

An automatic mode changing for the car audio system with a hands-free therein is now explained below.

FIG. 4 is a flow chart describing an automatic mode changing method for a car audio system with a hands-free therein according to the present invention. Specified otherwise, every step described below is performed by the audio micom 110. As shown in FIG. 4, it is decided whether a DTMF tone signal is input in the mobile phone 220 (S10). When a driver operates number keys of the mobile phone 220, a corresponding DTMS tone signal is input in the hands-free module 150 through a voice signal receiving terminal (RX) of the mobile phone jack 152, and the hands-free module 150 informs the audio micom 110 about this. If the DTMF tone signal is input in step 10, the audio micom 110 decides whether a current mode is in audio mode (S12). If the current mode is in audio mode in step 12, the current mode is changed to a hands-free mode (S14).

Next, it is decided whether the driver input (pressed) a mode conversion key (S16). In case that the mode conversion key is not input, the audio micom 110 decides if silence duration count (T) value is greater than a predetermined reference time (Tr), say 60 sec (S18). If it turns out that the silence duration count (T) value is less than the predetermined reference time (Tr), the audio micom 100 finds out whether the level of a received voice signal is greater than a predetermined reference level (Vr), say 500 mV (S22). At this time, the hands-free module 150 decides whether the level of the received voice signal lasts longer than a predetermined time, e.g. 300 msec, at regular time intervals, e.g. 2 sec, and if so, it outputs a signal to the audio micom 112 in order to inform this fact. Particularly, this step 22 is performed to find out if the received voice signal is a normal voice signal or noise.

In step 22, if the level of the received voice signal is greater than the reference level (Vr), this means that the current mode is in conversation mode. Thus, the silence duration count (T) value is cleared (S24), and the audio micom 110 returns to step 16. As such, if the silence duration count (T) value exceeds the reference time (Tr) in step 18, the audio micom decides that even though the driver completed the call, he (or she) may have forgotten pressing the mode conversion key. Hence, the audio micom 110 performs step 26, and automatically converts the current mode to the audio mode. Of course, in case that the driver pressed the mode conversion key in step 16, the audio micom 110 immediately performs step 26, regardless of whether or not the silence duration count (T) value reaches the reference value (Tr), converts the current mode to the audio mode.

In conclusion, the automatic mode changing method for a car audio system with the hands-free therein can be advantageously used for maximizing the convenience of drivers by automatically converting the audio mode to the hands-free mode or vice versa, depending on whether a voice signal is output from the mobile phone.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. An automatic mode converting method for a car audio system with a hands-free therein, wherein the car audio system has a mode converting function conducting mode conversion between a hands-free mode for outputting a received voice signal from a mobile phone and an audio mode for outputting an audio sound source of the car audio system, the method comprising:

deciding whether a DTMF tone signal is input from the mobile phone;

converting a current mode to the hands-free mode, if the DTMF tone signal is input from the mobile phone; and automatically converting the current mode to the audio mode, if a duration time of a greater level of the received voice signal from the mobile phone than a predetermined reference level lasts longer than a predetermined reference time.

2. The method according to claim 1, further comprising:
converting the current mode to the audio mode, regardless of whether or not the reference time is passed, if a manual operation key signal of the mode conversion function is input.

* * * * *